Patented Dec. 5, 1922.

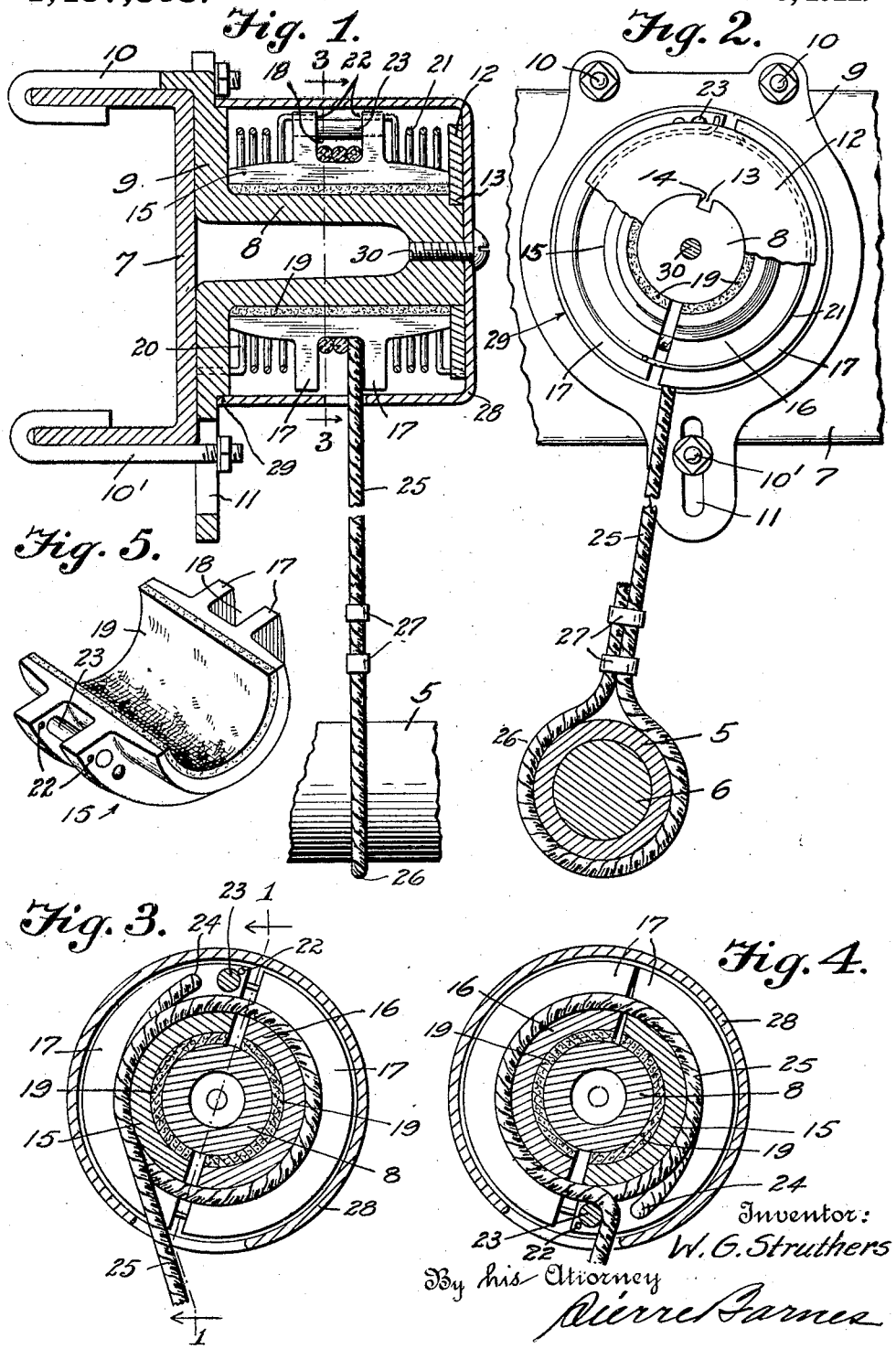

1,437,868

UNITED STATES PATENT OFFICE.

WILLIAM G. STRUTHERS, OF SEATTLE, WASHINGTON, ASSIGNOR TO STRUTHERS ABSORBER COMPANY, OF SEATTLE, WASHINGTON, A CORPORATION OF WASHINGTON.

SHOCK ABSORBER.

Application filed April 25, 1921. Serial No. 464,294.

*To all whom it may concern:*

Be it known that I, WILLIAM G. STRUTHERS, a citizen of the United States, residing at Seattle, in the county of King and State of Washington, have invented certain new and useful Improvements in Shock Absorbers, of which the following is a specification.

This invention relates to shock absorbers and snubbers; and the object of the invention is to provide a simple, compact and efficient device of this character which may be readily attached to vehicles, such as automobiles, and which will effectively absorb and eliminate shocks due to the rebound of the body of the vehicle.

Other objects are to provide a device which automatically adapts itself to the relative movements between the body and axle of the vehicle and which may be conveniently adjusted to suit vehicles of different sizes.

The invention consists in the novel construction, adaptation and combination of parts, as will be hereinafter described and claimed.

In the accompanying drawings, Figure 1 is view partly in rear elevation and partly in section of an embodiment of my invention shown applied, said section being taken substantially on broken line 1—1 of Fig. 3. Fig. 2 is a view in end elevation of the same with the casing omitted and parts broken away. Fig. 3 is a view in transverse vertical section taken on broken lines 3—3 of Fig. 1. Fig. 4 is a similar view showing the device in snubbing position. Fig. 5 is a perspective view of one of the sleeve members.

Referring to the drawings, 5 represents the housing of a vehicle wheel axle 6, and 7 is one of the side channel bars of the frame or chassis.

8 represents a stub shaft extending horizontally from a wall member 9 which is rigidly secured to the side of the frame bar 7 as by means of hook bolts 10 and 10¹ engaging the bar flange elements as shown in Fig. 1. To accommodate different sizes of bars 7, a slot 11 is provided in the lower portion of the member 9 to receive the bolt 10¹.

Upon the outer end of the stub shaft 8 is an annular fitting or washer 12 which is coupled against rotary movements as by the provision of a tooth 13 on the washer engaging in a recess 14 of the shaft.

Rotatable upon said shaft is a sleeve divided diametrically to afford two complementary semitubular members 15 and 16 hereinafter designated as the "jaws."

These jaws are provided intermediate their lengths with similarly disposed circumferentially extending flange elements 17 to provide channels 18 about the outer peripheries of the respective jaws and in circular alignment with each other. Said jaws are advantageously bushed with respect to the shaft by the provision of liners 19 formed of asbestos or other suitable material of high frictional characteristics.

20 and 21 represent helical springs, one end of each engaging in a hole 22 of a jaw flange and their other ends engaging respectively in holes provided in the wall member 9 and the washer 12.

Adjacent to the gap or opening between the jaws 15 and 16, is a pin 23 secured in the flanges of the jaw 15 and extending across the channel 18 thereof.

Secured in one of the flanges 17 of the jaw 15 and desirably in proximity to said pin 23 is the end 24 of a cable 25. This cable is coiled one or more times in the channels 18 about both jaws, extending below said pin, and thence to an axle or, as shown, to housing 5 to which the other end of the cable is secured as by means of a bight 26 and clips 27.

To protect said sleeve and associated parts of the device from dirt, a casing 28 is desirably provided. As shown in Fig. 1 said casing fits over an annular shoulder 29 provided on the wall part 9 and is removably held in place by means of a screw 30 engaging in the end of the stub shaft. Normally the various parts of the shock absorber occupy substantially the relative positions in which they are represented in Figs. 1, 2 and 3.

The springs 20 and 21 serve to yieldingly retain the pair of jaws 15 and 16 in rotary position to accommodate the up-and-down movements of the vehicle body, subject to the action of the springs supporting the same, and with respect to the wheel axle and obviate slack in the cable 25.

When the vehicle wheels, however, encounter hummocks or other obstacles in the road, the resultant spring rebounding movements of the body exercise strong tensional force through the cable causing the coils of the latter to bind the jaws 15 and 16 and cause the same to frictionally embrace the stub shaft 8 to gradually absorb the shock. With excessive or rapid rebounding movements, the jaw members may revolve until the pin 23 is brought against the cable as shown in Fig. 4 to accordingly snub the cable to positively prevent any further unwinding of the cable from the jaws.

What I claim, is,—

1. In a shock absorber, the combination with the frame of a vehicle and an axle, of a shaft rigidly secured to said frame, a sleeve comprising two complementary jaw elements revolubly mounted on said shaft, a cable wound about said sleeve, one end of the cable being connected to said axle and its other end secured to one of the sleeve jaw elements, and a torsional spring tending to prevent the unwinding of the cable from said sleeve.

2. In a shock absorber, the combination with the frame of a vehicle and an axle, of a shaft rigidly secured to said frame, a sleeve comprising two complementary jaw elements revolubly mounted on said shaft, a cable wound about said sleeve, one end of the cable being connected to said axle and its other end secured to one of the sleeve jaw elements, a torsional spring tending to prevent the unwinding of the cable from said sleeve, and a cable engaging snubber element carried by one of said jaw elements to limit the unwinding of the cable from said sleeve and limiting the rotation of the same.

3. In a shock absorber, the combination of a stationary shaft, a sleeve comprising two complementary jaw elements rotatably mounted thereon, a flexible member coiled about said sleeve and having one of its ends secured to one of said jaw elements, means connected to said sleeve to maintain tension on said flexible member so that when the latter is being withdrawn from the sleeve the jaw elements thereof are caused to grip said shaft.

4. In a shock absorber, the combination of a stationary shaft, a sleeve rotatably mounted upon the shaft, said sleeve comprising two opposed jaw elements, a flexible member coiled about said sleeve, means connected to said sleeve to cause one of the jaw elements thereof to frictionally engage said shaft, and a snubbing pin secured to one of said jaw elements and serving to limit the unwinding of the flexible member from said sleeve.

Signed at Seattle, Washington, this 18th day of April, 1921.

WILLIAM G. STRUTHERS.

Witnesses:
  PIERRE BARNES,
  MARGARET G. SUPPLE.